Figure 1:
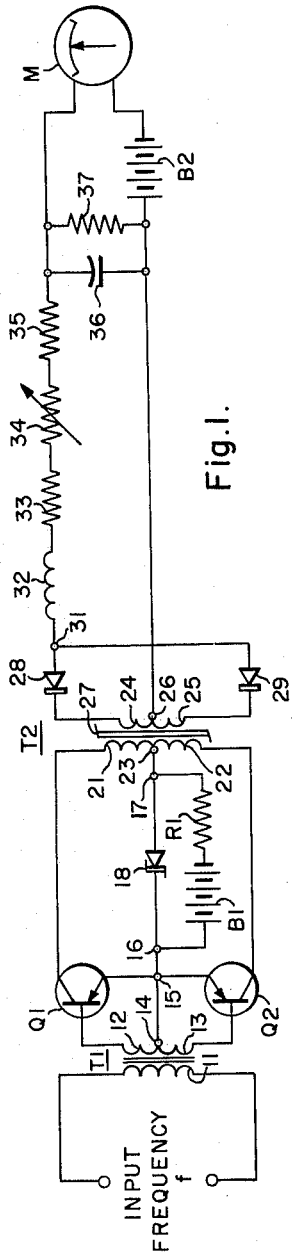

April 5, 1966  F. T. THOMPSON ET AL  3,244,959
FREQUENCY TO VOLTAGE TRANSDUCER
Filed Aug. 27, 1962

United States Patent Office 3,244,959
Patented Apr. 5, 1966

3,244,959
FREQUENCY TO VOLTAGE TRANSDUCER
Francis T. Thompson and Leonard C. Vercellotti, Penn Hills Township, Allegheny County, Pa., assignors to Westinghouse Electric Corporation, Pittsburgh, Pa., a corporation of Pennsylvania
Filed Aug. 27, 1962, Ser. No. 219,627
6 Claims. (Cl. 321—2)

This invention relates, generally, to frequency to voltage transducers and, more particularly, to such transducers of the solid-state type.

An accurate frequency to voltage transducer is required for use in the receiver of telemetering apparatus of the frequency type in which a transmitter converts a D.C. signal to a proportional frequency for sending over a transmission channel, and a receiver converts the received frequency to a D.C. quantity exactly proportional to the D.C. signal applied to the transmitter.

Accordingly, an object of this invention is to provide a frequency to voltage transducer having the following characteristics:

(1) A highly linear and accurate frequency to voltage relationship;

(2) A low impedance D.-C. voltage output source that will permit several independent outputs to be obtained without interaction;

(3) Current reversal in the output does not reduce the accuracy;

(4) Adequate power output;

(5) Ease of temperature compensation over a wide temperature range.

In a prior transducer, the constant volt-second characteristic of a saturating core of the square wave type is utilized to convert frequency to voltage. The time during which such a core supports voltage may be expressed by the formula:

$$\Delta t = \frac{2B_{max}A_cN10^{-8}}{E} \text{ seconds}$$

where:
$B_{max}$ is the saturation flux density in gases,
$A_c$ is the area of the core in cm.$^2$,
$N$ is the number of turns across which the voltage E in volts is supported.

At the end of the period $\Delta t$ the core saturates. The core will reset and support the applied voltage in the opposite direction when the input signal changes direction. The volt-second area, $E\Delta t$, of each pulse is normally assumed to be independent of the voltage E and the input frequency, $f$, as long as the core saturates on each half cycle. As the frequency is increased the number of equal volt-second area pulses per unit time increases. If these pulses are rectified by ideal diodes and filtered by an inductive input filter which responds to the pulse area, the average or D.-C. output voltage is proportional to frequency.

However, there are several difficulties which prevent the achievement of the desired characteristics with the prior circuit:

(1) The volt-second area is not independent of the induced voltage E. A 10% change in E will cause a 1% change in the volt-second area and therefore a 1% change in the D.C. output voltage.

(2) The forward diode voltage drops are not negligible for the normal range of output voltage. The diode drop shifts the frequency versus voltage characteristic so that an extension of the linear portion will not intersect the origin. In addition, the variation of diode drops with temperature makes the temperature compensation problem more difficult.

(3) Sufficient inductance must be provided in the filter to prevent the inductor current from attempting to reverse. The current cannot reverse because of the diode rectifiers. If the inductor current falls to zero between voltage pulses, the output voltage across the capacitor will tend toward the peak value and the accuracy and linearity will be lost.

(4) Zero suppression aggravates the current reversal problem. In telemetering equipment of the frequency type which operates over a 15 to 35 c.p.s. range, zero output must be provided at 25 c.p.s. In order to accomplish this a D.-C. voltage source equal to the D.-C. output of the saturating transformer circuit at 25 c.p.s. is introduced in series with the meter load. At lower frequencies this source provides a current component opposite to the current from the saturating transformer. As a result, the inductance has to be increased and a large bleeder resistance is necessary across the filter capacitor. This results in excessively high currents at 35 c.p.s. and reduces the linearity of the frequency to voltage converter because it accentuates the change in the induced voltage $E_1$.

(5) The saturation flux density, $B_{max}$, of the core has a negative temperature coefficient of approximately 0.07%/° C. This results in a 3.5% reduction in the output voltage over a temperature range of 0° C. to 50° C. This change is normally compensated by a negative temperature coefficient (NTC) resistor. The compensation with the NTC resistor is somewhat difficult over a wide temperature range since the variation of resistance with temperature is exponential while the change in the saturating core output is nearly linear with temperature. In addition, the provision of a span adjusting resistor changes the effectiveness of the NTC resistor since the percentage change in resistance is altered.

(6) The temperature compensation is made much more difficult by the large choke required by difficulties (3) and (4). The copper resistance of the choke increases with temperature by 0.38%/° C. which represents a change of 19% over the range of 0° C. to 50° C. The resistance change of the choke required for operation at 15 to 35 c.p.s. approximately doubles the NTC resistor compensation required for the core. The large thermal time constant of the choke as compared to the short time constant of the NTC resistor makes the circuit susceptible to inaccuracy with rapid changes in temperature.

(7) A low output impedance is difficult to obtain because of the resistance added by the choke and the NTC resistor. This problem may be overcome, however, by using a separate choke and NTC resistor for each output.

In accordance with the present invention, the foregoing difficulties are overcome by utilizing a Zener diode to regulate the voltage applied to the saturating core during the interval, $\Delta t$, that the core supports voltage, thereby making the voltage applied across the core fixed and not a function of frequency. Two push-pull transistors alternately connect opposing windings on the saturating core across the Zener diode. The output across the Zener diode is a rectified sequence of pulses with a fixed voltage-time area. The frequency of this pulse train is twice the frequency of the input signal and the average value of this voltage is proportional to input frequency. Two amplifiers are driven by the output of the Zener diode, and switch a second Zener diode. The output across the second Zener diode is a low impedance source of pulses with a fixed voltage-time area. The average value of these pulses is proportional to frequency.

Figure 2:
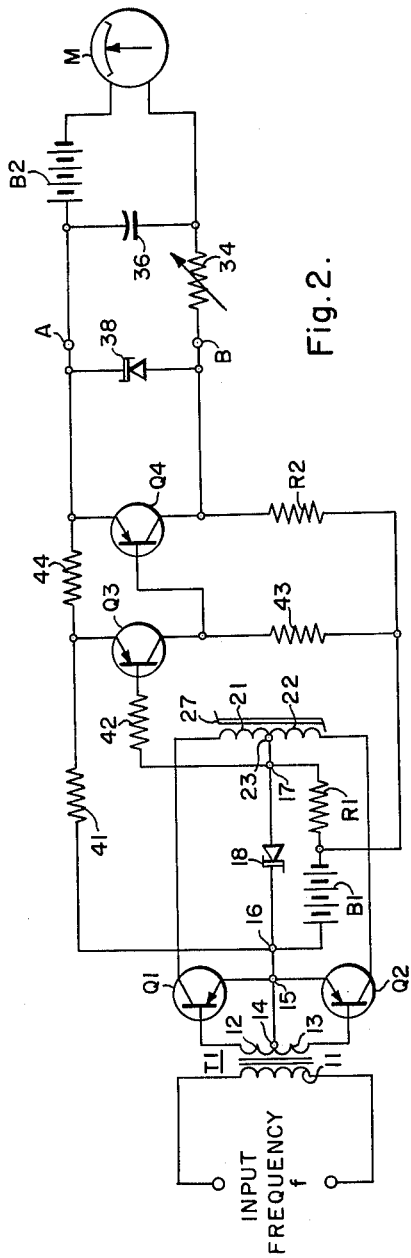

For a better understanding of the nature and objects of the invention, reference may be had to the following detailed description, taken in conjunction with the accompanying drawing, in which:

FIGURE 1 is a diagrammatic view of a circuit embodying features of the invention; and, FIGURE 2 is a diagrammatic view of a circuit embodying additional features of the invention.

Referring to the drawing, and particularly to FIG. 1, the apparatus shown therein comprises a signal transformer T1, a saturating transformer or inductive device T2, and an indicating instrument M. The transformer T1 has a primary winding 11, which may be energized by an alternating potential having a frequency $f$, and two secondary windings 12 and 13 which have a common terminal 14. The base of a transistor Q1 is connected to the end terminal of the winding 12. Likewise, the base of a transistor Q2 is connected to the end terminal of the winding 13. The emitters of the transistors Q1 and Q2 are connected to a common terminal 15 which is connected to the terminal 14. Input terminals 16 and 17 are connected to a source of unidirectional potential, such as a battery B1. A Zener diode 18 is connected between the terminals 16 and 17 and, therefore, is connected across the battery B1 in series-circuit relation with a resistor R1.

The inductive device or transformer T2 has primary windings 21 and 22, which have a common terminal 23, and secondary windings 24 and 25 which have a common terminal 26. The windings of the device T2 are disposed on a saturating core 27 which is composed of iron having a square or rectangular core loop characteristic. The collector of the transistor Q1 is connected to the end terminal of the winding 21. Likewise, the collector of the transistor Q2 is connected to the end terminal of the winding 22. The common terminal 23 is connected to the terminal 17.

A rectifying diode 28 is connected to the end terminal of the winding 24 and a similar diode 29 is connected to the end terminal of the winding 25. The two diodes are connected to a common terminal 31 which is connected to one terminal of the meter M through an inductance 32, a resistor 33, a span adjusting resistor 34, and a resistor 35 which has a negative temperature coefficient. The common terminal 26 of the windings 24 and 25 is connected to the other terminal of the meter M in series-circuit relation with a voltage suppression means, such as a battery B2. A filter, comprising a capacitor 36 and a resistor 37, is connected across the rectified output of the secondary windings.

The input signal of frequency $f$ is assumed to be of sufficient power to switch Q1 and Q2. Additional amplification consisting of either single ended or balanced drivers may be used if necessary to achieve this switching. As previously explained, the core 27 supports voltage for a time $\Delta t$. At the end of the period $\Delta t$ the core saturates. The core will reset and support the applied voltage in the opposite direction when the input signal changes direction.

The circuit shown in FIG. 1 improves the linearity, as compared with prior circuits, by fixing the voltage across the core prior to saturation. The Zener diode 18 regulates the voltage applied to the core during the interval, $\Delta t$, that the core supports voltage. The current required by the Zener diode while it is regulating and the core magnetizing current are supplied by the battery B1 through a current limiting resistor R1. The transistors Q1 and Q2 are switched alternately to connect either the winding 21 or the winding 22 and the Zener diode 18 in parallel-circuit relation across the battery B1 in series-circuit relation with the resistor R1. After the core saturates, the voltage across the Zener diode is equal to the $V_{ce}$ drop of the transistor, less than 0.1 volt, plus the IR drop in the transformer winding. The voltage applied across the core is fixed and is not a function of frequency. This eliminates the main cause of non-linearity in previously known circuits. The pulse width before saturation is constant over the frequency range of operation, thereby resulting in high linearity and accuracy. In high frequency circuits, it may be desirable to replace the Zener diode with a source of substantially constant D.-C. potential and an ordinary diode having low junction capacitance.

The voltage suppression battery B2 and the span adjusting resistor 34 may be utilized to give a zero reading on the meter M at either 15 c.p.s. or 25 c.p.s. in a telemetering system which operates over a frequency range of 15 to 35 c.p.s. The inductance 32 and the resistor 33 constitute a choke for preventing the inductor current from falling to zero between pulses, thereby maintaining a flow of current in one or the other of the diodes 28 and 29. The resistor 35 compensates for changes in temperature over a wide range, for example, 0° C. to 50° C., which would otherwise affect the accuracy of the system.

The circuit shown in FIG. 1 is most practical for low power outputs. Prior to saturation, the current from the battery B1 must be adequate to supply the magnetizing current, the reflected load current, and sufficient current for good Zener diode regulation. If large power outputs are attempted, the reflected current will be large enough to cause a substantial IR drop in the transformer primary which once again varies the pulse height.

In order to take full advantage of the possibilities of the circuit shown in FIG. 1, the circuit shown in FIG. 2 may be utilized. This circuit solves all of the previously listed problems. The input portion is identical to that of FIG. 1. No secondary winding on the saturating core 27 is required. Advantage is taken of the fact that a rectified output of the saturating core is available across the Zener diode 18.

In order to achieve high power output, the waveform across the Zener diode 18 is amplified by switching transistors Q3 and Q4. During the fixed interval, $\Delta t$, transistor Q4 is non-conducting, and current is supplied to a second Zener diode 38 and to the span adjusting resistor 34 through a resistor R2. The voltage across Q4 is regulated by the Zener diode 38 at a predetermined voltage, for example $-16$ volts. After the core saturates, Q4 conducts and the voltage across the transistor is less than 0.1 volt.

The voltage across transistor Q4 switches between two fixed values of voltage. Since these voltages do not depend upon the continuous conduction of diodes, as in the scheme of FIG. 1, an inductive filter is not required. The current is permitted to reverse in resistor 34 and high accuracy may be achieved with no filter, an R-C filter or an L-C filter. The circuit has the further advantage of covering an extremely wide frequency range since it can be operated with accuracy at a fraction of a cycle per second.

Wide range temperature compensation is readily accomplished with this circuit. The Zener diode 18 has a negligible temperature coefficient. Since a constant voltage with temperature is provided, the time, $\Delta t$, during which the core supports voltage will decrease with increasing temperature by .07% °/C. A voltage of 16 volts was chosen for Zener diode 38 since its voltage increases with increasing temperatures by .07% °/C. The decrease in pulse width is compensated by the increase in voltage so that the average voltage remains constant with temperature. No negative temperature coefficient resistor compensation is required. The linear type compensation provided by the Zener diode simplifies wide range temperature compensation.

The source impedance across transistor Q4 is very low (approximately 15 ohms) since the voltage is regulated by the Zener diode at 16 volts or by the saturated transistor at less than 0.1 volt. Several outputs may be connected across points A and B in FIG. 2 with negligible interaction because of this low impedance. The span adjusting resistor 34 does not alter the temperature compensation since the voltage across Q4 is fully temperature compensated. Several outputs with their own independent span adjustment may be connected between terminals A and B.

Since the current is permitted to reverse in resistor 34 without affecting the accuracy, no bleeder resistor is required across the capacitor 36. The capacitor 36, which may be utilized to reduce the ripple is not actually required. The circuit is more efficient than the conventional circuit since no output power is dissipated in a bleeder resistor.

In addition to the resistors already mentioned, resistors 41, 42, 43 and 44 are provided in the circuits for the amplifying transistors Q3 and Q4. These resistors function in the usual manner in these circuits. As stated previously, the input portion of the circuit shown in FIG. 2 is identical to and functions in a manner similar to the input portion of the circuit shown in FIG. 1.

From the foregoing description, it is apparent that the invention provides an improved solid-state frequency to voltage transducer which is particularly suitable for utilization in the receiver of a telemetering system of the frequency type. The present transducer is also applicable in other apparatus where accurate frequency to voltage conversion is required.

Since numerous changes may be made in the above-described apparatus and different embodiments may be made without departing from the spirit thereof, it is intended that all the matter contained in the foregoing description or shown in the accompanying drawing shall be interpreted as illustrative and not in a limiting sense.

We claim as our invention:

1. A frequency to voltage transducer comprising an inductive device having a winding and a magnetic core having a rectangular core loop characteristic adapted to saturate within its working range, signal terminals adapted to be connected to a source of alternating potential the frequency of which is to actuate the transducer, input terminals adapted to be connected to a source of unidirectional potential, switching apparatus having a first operating condition in which said winding is connected to said input terminals and said source for energization of said core in a first direction and having a second operating condition in which said winding is connected to said input terminals and said source for energization of said core in a second direction, means connecting said switching apparatus to said signal terminals to place the apparatus in said first operating condition as a consequence of a first polarity at said signal terminals and in said second operating condition as a consequence of a second polarity at said signal terminals, a Zener diode connected between said input terminals and connected in parallel with said winding by said switching apparatus in both operating conditions of said switching apparatus to maintain the potential across said winding at substantially a predetermined value prior to saturation of said core when said winding is connected to said source, and a resistor connected to one of said input terminals in series with said source of unidirectional potential.

2. A frequency to voltage transducer comprising an inductive device having a winding and a magnetic core having a rectangular core loop characteristic adapted to saturate within its working range, signal terminals adapted to be connected to a source of alternating potential the frequency of which is to actuate the transducer, input terminals adapted to be connected to a source of unidirectional potential, switching apparatus having a first operating condition in which said winding is connected to said input terminals and said source for energization of said core in a first direction and having a second operating condition in which said winding is connected to said input terminals and said source for energization of said core in a second direction, means connecting said switching apparatus to said signal terminals to place the apparatus in said first operating condition as a consequence of a first polarity at said signal terminals and in said second operating condition as a consequence of a second polarity at said signal terminals, and means connected in circuit relation with said input terminals and connected in parallel with the winding by said switching apparatus in both operating conditions of said switching apparatus for maintaining a substantially constant potential across said winding prior to saturation of said core when said winding is connected to said source.

3. A frequency to voltage transducer comprising an inductive device having opposing windings on a magnetic core having a rectangular core loop characteristic adapted to saturate within its working range, signal terminals adapted to be connected to a source of alternating potential the frequency of which is to actuate the transducer, input terminals adapted to be connected to a source of unidirectional potential, switching apparatus having a first operating condition in which one of said windings is connected to said input terminals and said source for energization of said core in a first direction and having a second operating condition in which the other of said windings is connected to said input terminals and said source for energization of said core in a second direction, means connecting said switching apparatus to said signal terminals to place the apparatus in said first operating condition as a consequence of a first polarity at said signal terminals and in said second operating condition as a consequence of a second polarity at said signal terminals, and means connected across said input terminals for maintaining a substantially constant potential across the input terminals and each of said windings prior to saturation of said core when each winding is connected to said source, the last-mentioned means being alternately connected in parallel with each winding by said switching apparatus.

4. A frequency to voltage transducer, comprising an inductive device having two opposing windings on a magnetic core adapted to saturate within its working range, signal means adapted to be connected to a source of alternating potential the frequency of which is to actuate the transducer, output means, input terminals adapted to be connected to a source of unidirectional potential, voltage regulating means connected across said input terminals, switching means controlled by said signal means to connect the input terminals, said source, and the voltage regulating means alternately across each of said opposing windings, potential across each winding being maintained at a constant potential by said voltage regulating means prior to saturation of the core when each winding is connected to said source and amplifying means directly connected between the input terminals and said output means.

5. A frequency to voltage transducer, comprising an inductive device having two opposing windings on a magnetic core adapted to saturate within its working range, signal means adapted to be connected to a source of alternating potential the frequency of which is to actuate the transducer, output means, input terminals adapted to be connected to a source of unidirectional potential, a Zener diode connected across said input terminals, switching means controlled by said signal means to connect the input terminals, said source and the Zener diode alternately across each of said opposing windings, the potential across each of said windings being maintained at substantially a constant value by said Zener diode prior to saturation of said core when each winding is connected to said source, amplifying means directly connected between the input terminals and said output means, and a second Zener diode connected across said amplifying means.

6. A frequency to voltage transducer comprising an inductive device having opposing windings on a magnetic core having a rectangular core loop characteristic adapted to saturate within its working range, signal means adapted to be connected to a source of alternating potential the frequency of which is to actuate the transducer, output means, input terminals adapted to be connected to a source of unidirectional potential, a Zener diode connected across said input terminals, switching means controlled by said signal means to alternately connect each winding to the input terminals and said source to energize the core in alternate directions, the potential across said primary winding being maintained at substantially a constant value by said Zener diode prior to saturation of said core when said primary winding is connected to said source, and amplifying means directly connecting the input terminals to said output means.

References Cited by the Examiner

UNITED STATES PATENTS

| | | | |
|---|---|---|---|
| 2,836,784 | 5/1958 | Gross | 321—16 |
| 3,004,220 | 10/1961 | Williamson | 324—78 |
| 3,018,381 | 1/1962 | Carroll et al. | 307—88.5 |
| 3,021,480 | 2/1962 | Nye | 307—88.5 |
| 3,029,398 | 4/1962 | McComb | 331—113.1 |
| 3,067,376 | 12/1962 | Kwast | 321—16 |
| 3,147,406 | 9/1964 | Kotas | 331—113 X |

FOREIGN PATENTS 1,076,790  3/1960  Germany.

LLOYD McCOLLUM, *Primary Examiner.*

J. C. SQUILLARO, G. J. BUDOCK, G. GOLDBERG,
*Assistant Examiners.*